Nov. 5, 1940.	F. J. EVANS	2,220,322

FILTER

Filed July 3, 1939

INVENTOR
FRANKLIN J. EVANS
BY
HIS ATTORNEY

Patented Nov. 5, 1940

2,220,322

UNITED STATES PATENT OFFICE 2,220,322

FILTER

Franklin J. Evans, Hazleton, Pa., assignor to Oliver United Filters Incorporated, Oakland, Calif., a corporation of Nevada Application July 3, 1939, Serial No. 282,709

5 Claims. (Cl. 210—199)

This invention relates in general to rotary drum filters and in particular to a valve mechanism by which the pressures on either side of the cake formed on the drum can be equalized just prior to the point of discharge so that the cake may be removed more readily.

Ordinarily the drum of a rotary drum filter is provided on its periphery with a plurality of independent filtrate compartments. Each of these compartments communicates with an automatic valve carried on one of the drum trunnions and by means of which each of the filtrate compartments may be successively subjected to either subatmospheric pressure, atmospheric pressure, or superatmospheric pressure, as desired, for the purpose of picking up a cake during the actual filtering cycle and for then discharging the cake from the drum. The capacity of a filter of this type is somewhat restricted and therefore filters have recently been built wherein the drum is formed on its periphery with individual compartments, each provided with an independent valve opening directly into the interior of the drum. The filtrate entering the drum from the filtrate compartments passes out of the drum through one of the hollow trunnions to a barometric leg or vacuum receiver.

In operation, the interior of the drum is maintained under subatmospheric pressure and the valves referred to are closed once during each revolution of the drum so as to seal the section or compartment being discharged from the action of vacuum within the drum. A filter of this type is shown in the Young Patent No. 2,052,156, and although this type of filter has a very high capacity, some trouble has been experienced with the individual gravity operated valves. It is frequently necessary to adjust these valves and since there are eighteen of them in an average size filter and since to adjust any one of them the filter must be shut down, a great deal of time is lost.

In general, the object of my invention is the provision of a non-sectionalized rotary drum filter having an unobstructed interior and provided with means for continuously blanking off that portion of the drum which is being discharged of its filter cake.

More specifically, the object of this invention is the provision of a non-sectionalized rotary drum filter wherein the interior of the drum is blanked off by a rubber roll eccentrically mounted so as to contact and seal that portion of the drum which is being discharged of its cake.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing.

Figure 1:
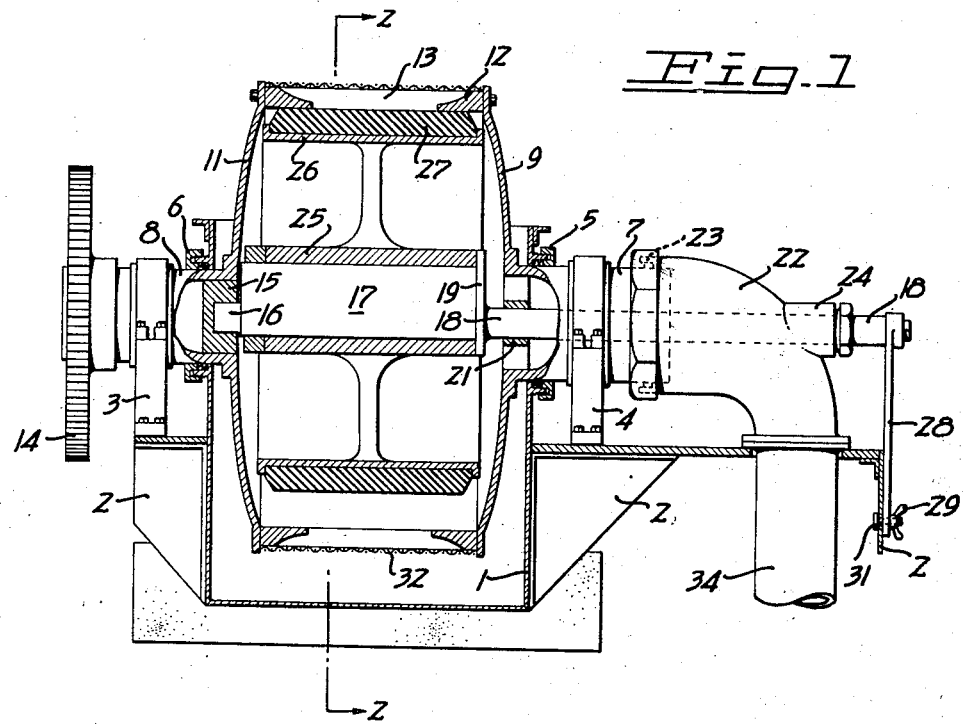
Figure 1 is a vertical section taken on the line 1—1 of Figure 2 and showing a rotary drum filter embodying the objects of my invention.
Figure 2:
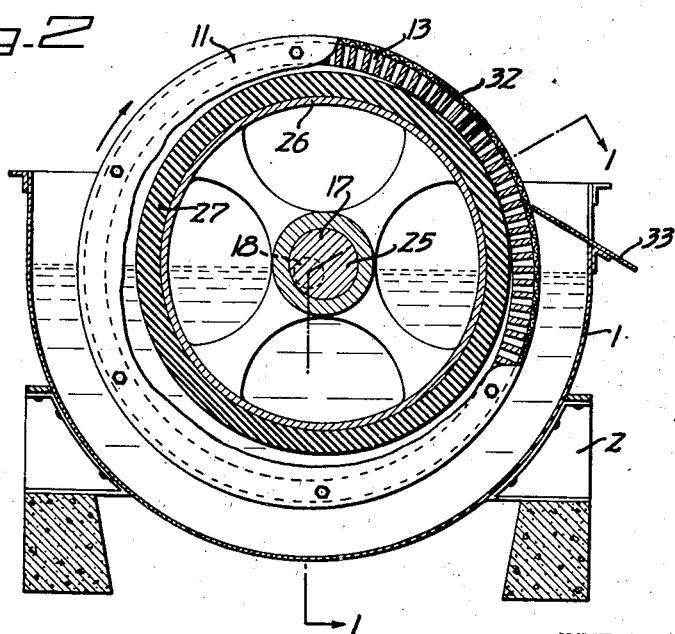
Figure 2 is a transverse section taken on the line 2—2 of Figure 1.

The filter shown in these two figures comprises a generally semi-cylindrical tank 1 mounted on a suitable frame 2. Journaled on bearings 3 and 4 carried by the frame 2 and passing through stuffing boxes 5 and 6 formed in the ends of the tank 1 are trunnions 7 and 8. Formed integral with the trunnions 7 and 8 are dished drum heads 9 and 11, between which is bolted and sealed a drum or cylinder 12 formed with milled slots 13 establishing communication between the exterior and interior of the drum. Carried on the outer end of the trunnion 8 is a ring gear 14 for driving the drum 12, and secured within the inner end of this trunnion is a bushing 15 within which is journaled a pin 16 eccentrically formed on the left hand end of a shaft 17. In longitudinal alignment with the pin 16 is a shaft 18 secured to the shaft 17 by a plate 19. The shaft 18 is journaled in a spider 21 formed in the trunnion 7 and extends outwardly through an elbow 22. This elbow is sealed to the trunnion 7 by a stuffing box 23 and is also provided with a stuffing box 24 through which the right hand end of the shaft 18 passes.

Journaled on the shaft 17 is a sleeve 25 carrying a cylinder 26 to which is vulcanized a soft rubber tire 27. The rubber tire 27 may be made to contact any desired portion of the inner periphery of the drum 12 by rotating the shaft 17 about the eccentrically disposed pin 16 and shaft 18. This may be done by a sector 28 secured to the end of the shaft 18. The sector 28 may be held to the frame in any predetermined position by means of a wing nut 29 and a bolt 31 secured to the frame 2 and passing through an arcuate slot formed in the sector 28. Disposed over the slotted surface of the drum 12 is a filter medium 32 and carried by the tank 1 is a scraper or doctor blade 33 for removing or discharging the cake deposited on the drum. Depending from the elbow 22 is a conduit 34 communicating with any suitable source of subatmospheric pressure.

Before the filter is put into operation, the sector 28 is adjusted so as to make the rubber tire 27 contact the interior of the drum 12 opposite the point at which it is desired to discharge the filter cake. The pulp or slurry to be filtered is maintained within the tank at a level somewhat above the lower level of the trunnion 7 so that the filtrate contained within the drum at this level may flow by gravity out through this trunnion. The drum 12 is then slowly rotated by the ring gear 14 and then its interior subjected to subatmospheric pressure through the elbow 22 and the conduit 34. The rubber tire 27 carried by the cylinder 26 is driven by frictional engagement with the inner surface of the drum 12 and due to the contact between these two members a number of the slots 13 just above the line of discharge are sealed from the action of the subatmospheric pressure within the drum 12. This type of filter is particularly designed for use in the paper industry and ordinarily a sheet of paper pulp picked up by the drum 12 is of sufficient porosity so that the pressures on its exterior and interior are equalized as soon as its under side has been sealed from the interior of the drum 12.

By the means above described, the necessity of providing the periphery of the filter drum with a plurality of independent filtrate compartments is obviated, as well as the necessity of providing an independent valve for each of these compartments so that the vacuum therein may be individually controlled.

I claim:

1. A filter comprising: a tank; a closed-ended perforate drum mounted for rotation within said tank; means for maintaining a differential filtering pressure between the exterior and interior of said drum; a cake discharging device mounted adjacent said drum; and an endless band carried within said drum and arranged to contact and rotate therewith opposite the point at which said discharging device is mounted.

2. A filter comprising: a tank; a closed-ended perforate drum mounted for rotation within said tank; means for maintaining a differential filtering pressure between the exterior and interior of said drum; a cake discharging device mounted adjacent said drum; and an endless compressible band carried within said drum and arranged to contact and rotate therewith opposite the point at which said discharging device is mounted.

3. A filter comprising: a tank; a closed-ended perforate drum mounted for rotation within said tank; a cake discharging device mounted adjacent said drum; means for maintaining a differential filtering pressure between the exterior and interior of said drum; and a roll eccentrically mounted within said drum on an axis parallel to the axis of said drum and arranged to be rotated by frictional engagement with the drum at a point opposite said cake discharging device.

4. A filter comprising: a tank; drum trunnions journaled in the sides of said tank; drum heads carried by said trunnions; a perforate drum sealed to said heads; means for maintaining a differential filtering pressure between the exterior and interior of said drum; a rubber covered roll eccentrically mounted within said drum so as to have a band of contact with the inner peripheral surface of said drum; and means opposite said band of contact for discharging cake formed on said drum.

5. A filter comprising: a tank; a closed-ended perforate drum mounted for rotation within said tank; a filter medium covering the outer surface of said drum; means for maintaining a differential filtering pressure between the exterior and interior of said drum; a cake discharging device mounted adjacent said drum; and an endless band carried within said drum and arranged to contact and rotate therewith opposite the point at which said discharge device is mounted.

FRANKLIN J. EVANS.